United States Patent
Migdal et al.

(10) Patent No.: US 6,762,763 B1
(45) Date of Patent: Jul. 13, 2004

(54) COMPUTER SYSTEM HAVING A DISTRIBUTED TEXTURE MEMORY ARCHITECTURE

(75) Inventors: Christopher Migdal, Mountain View, CA (US); Philippe Lacroute, Sunnyvale, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/346,071

(22) Filed: Jul. 1, 1999

(51) Int. Cl.⁷ .................................................. G06T 1/20
(52) U.S. Cl. ........................................................ 345/506
(58) Field of Search .................................. 345/506, 552, 345/547, 541, 538, 537, 504, 502, 501, 430, 587, 582, 648, 544, 609, 522; 710/200; 711/147; 463/36, 345, 506, 582, 501, 502

(56) References Cited

U.S. PATENT DOCUMENTS

| | | | | |
|---|---|---|---|---|
| 4,949,280 A | * | 8/1990 | Littlefield | 364/518 |
| 5,767,858 A | * | 6/1998 | Kawase et al. | 345/552 |
| 5,841,444 A | * | 11/1998 | Mun et al. | 345/506 |
| 5,936,632 A | * | 8/1999 | Cunniff et al. | 345/582 |
| 6,292,200 B1 | * | 9/2001 | Bowen et al. | 345/506 |

* cited by examiner

Primary Examiner—Matthew C. Bella
Assistant Examiner—Dalip K. Singh
(74) Attorney, Agent, or Firm—Woodcock Washburn LLP (57) ABSTRACT

A scaleable network based computer system having a distributed texture memory architecture. A network residing within the computer system is used to transmit packets between a host processor and a number of subsystems. Three basic types of subsystems are coupled to the network: a geometry subsystem is used to process primitives; a rasterization subsystem is used to render pixels; and a display subsystem is used to drive a computer monitor. Any number and combination of these three types of subsystems can be coupled to one or more network chips to implement a wide variety of configurations. One or more memory chips can be coupled to any of the rasterization subsystems. These memory chips are used to store texture data. A rasterization subsystem can access texture data from its associated memory chips or can request texture data residing within any of the other memory chips. The request is sent over the internal network; the requested texture data is packetized and sent over the internal network to the requesting rasterization subsystem. Because texture data is distributed across the internal network and is accessible to any and all rasterization subsystems, there is no need to store duplicate copies. Furthermore, the computer system is readily scaleable simply by adding the appropriate geometry, rasterization, or display subsystem. Likewise, texture memory is readily scalable simply by adding more memory chips.

18 Claims, 6 Drawing Sheets

COMPUTER SYSTEM HAVING A DISTRIBUTED TEXTURE MEMORY ARCHITECTURE

FIELD OF THE INVENTION

The present invention relates to a scaleable network based computer system having a distributed texture memory architecture.

BACKGROUND OF THE INVENTION

Today, computers are used in many different applications. One application suited for computers is that of generating three-dimensional graphics. Computer-generated 3-D graphics is used in business, science, animation, simulation, computer-aided design, process control, electronic publication, etc. In an effort to portray a more realistic real-world representation, three dimensional objects are transformed into models having the illusion of depth for display onto a two-dimensional computer screen. This is accomplished by using a number of polygons to represent a three-dimensional object. Complex three-dimensional objects may require upwards of hundreds of polygons in order to form an accurate model. Hence, a three-dimensional object can be readily manipulated (e.g., displayed in a different location, rotated, scaled, etc.) by processing the individual respective polygons corresponding to that object. Next, a scan conversion process is used to determine which pixels of a computer display fall within each of the specified polygons. Thereupon, texture is applied to only those pixels residing within specified polygons. In addition, hidden or obscured surfaces, which are normally not visible, are eliminated from view. Consequently, displaying a three-dimensional object on a computer system is a rather complicated task and can require a tremendous amount of processing power.

This is especially true for those cases involving dynamic computer graphics for displaying three-dimensional objects that are in motion. In order to simulate smooth motion, the computer system should have a frame rate of at least 30 hertz. In other words, new images should be updated, redrawn and displayed at least thirty times a second. This imposes a heavy processing and computational burden on the computer system. Indeed, even more processing power is required for interactive computer graphics, where displayed images change in response to a user input and where there are multiple objects in a richly detailed scene. Each additional object that is added into a scene, needs to be modeled, scan converted, textured, Z-buffered for depth, etc., all of which, adds to the amount of processing resources that is required. In addition, it would be highly preferable if lighting, shadowing, shading, and fog could be included as part of the 3-D scene. Generating these special effects, again, consumes valuable processing resources. Hence, a major problem associated with producing realistic three-dimensional scenes is that it requires such a tremendous amount of processing power. The "richer" and more realistic a scene becomes, the more processing power that is required to render that scene. Moreover, speed becomes a major limiting factor as the computer must render millions of pixels in order to produce these amazingly complex scenes every three-tenths of a second. Even though the processing power of computer systems continues to improve, the trend is towards even faster, cheaper, and more powerful computer systems.

"Pipelining" is a common technique used for improving the overall performance of a computer system. In a pipelined architecture, a series of interconnected stages are used to render an image. Each stage performs a unique task during each clock cycle. For example, one stage might be used to scan-convert a pixel; a subsequent stage may be used for color conversion; another stage could be used to perform depth comparisons; this is followed by a texture stage for texturing; etc. In practice it would take several pipeline stages to implement any one of the previous example blocks. The advantage of using a pipelined architecture is that as soon as one stage has completed its task on a pixel, that stage can immediately proceed to work on the next pixel. It does not have to wait for the processing of a prior pixel to complete before it can begin processing the current pixel. Thereby, pixels can flow through the pipeline at a rapid rate. By analogy, a pipelined architecture is similar to a fire brigade whereby a bucket is passed from one person to another down the line.

There are limits to how many pipeline stages a task may be broken down to increase its performance. Eventually a point is reached when the adding of additional pipeline stages to a task no longer increases performance due to the overhead associated with pipelining. In order to increase performance over a single pipeline, several pipelines can be connected together in parallel. This technique is referred to parrallel-pipelined approach.

There are, however, several disadvantages with using a parallel-pipelined approach. One drawback to using a parallel-pipelined architecture is that because each of the pipelines operate independently from the other pipelines, each pipeline must have access to its own set of texture data. This is especially the case when several pipelines perform parallel processing together in order to generate a single frame's worth of data. As a result, duplicate copies of texture memory must be maintained. In other words, the same set of texture data must be replicated for each of the different pipelines. Furthermore, some computer vendors offer the option of adding extra plug-in cards to increase a computer's performance. Again, these cards operate independently of each other. And because they cannot communicate amongst themselves, each card must have its own dedicated memory; entire data sets are duplicated per each individual card.

This duplication is expensive in terms of the amount of memory chips which are required in order to store the duplicate information. Although prices for memory chips have been falling, many applications today require extremely large texture maps. Storing the entire texture map in dynamic random access memory chips is prohibitively expensive, especially if numerous duplicate copies of the texture map must be maintained. Moreover, textures exhibiting higher resolutions consume that much more memory. In addition, oftentimes the same texture map is stored at different levels of detail. Due to the extremely large memory requirements, computer manufacturers have taken to storing entire texture maps on disk. Pieces of the texture map are then loaded into memory chips on an as-needed basis. However, disk I/O operations are extremely slow. Thereby, computer designers face a dilemma: either limit the amount of texture data which can be stored and suffer visually inferior graphics or store texture data on disk and suffer much slower graphics displays.

Another disadvantage associated with a parallel-pipelined architecture pertains to scalability. In order to satisfy the price and performance demands across diverse customer groups, computer manufacturers have offered optional hardware in terms of extra microprocessors, digital signal processors, plug-in cards, peripherals etc. which can be added to the system as upgrades. Ideally computer graphics hardware would be scalable over a wide range, so that one basic product type could serve the needs of both low-end and high-end users. This would avoid the necessity of developing completely different products for different performance levels. Unfortunately, parallel-pipelined graphics systems are not well suited to scale over a wide range of performance levels. Reasons for this include the need to connect all the outputs from the different pipelines to produce a final video image, the inability of doing frame buffer copy type operations without adding more and more expensive interconnect as the system scales, etc. For this reason, parallel-pipelined architectures seen in the industry are usually limited to scalabilities of 2 to 1 and in some cases 4 to 1. Beyond this the architecture becomes prohibitively expensive.

Thus, there exists a need for a computer system which has a texture memory architecture which is inexpensive and yet fast. It would be highly preferable if such a texture memory architecture were to also be readily scaleable. The present invention provides a novel texture memory architecture which solves all the aforementioned problems.

SUMMARY OF THE INVENTION

The present invention pertains to a computer system having a distributed texture memory architecture. Basically, texture data is stored in separate memory chips distributed at different locations within the computer system. The texture data is accessible to any and all rasterization circuits. Because the texture data can be shared by multiple rasterization circuits, only a single copy of the texture memory need be maintained within the computer system. Furthermore, texture memory is readily scaleable simply by adding more rasterizers with their associated memory chips.

In the currently preferred embodiment, the present invention is practiced within a computer system having an internal network which is used to transmit packets between a host processor and a number of subsystems. Three basic types of subsystems are coupled to the network: a geometry subsystem is used to process primitives; a rasterization subsystem is used to render pixels; and a display subsystem is used to drive a computer monitor. The various subsystems coupled to the internal network can communicate with other subsystems over the network. Thereby, they can perform independent processes or work cooperatively. Any number and combination of these three types of subsystems can be coupled to one or more network chips to implement a wide variety of configurations. Furthermore, memory chips can be judiciously added to the rasterization to meet current memory demands. Texture and/or frame buffer data is stored in the memory chips. The data stored in the memory chips are accessible to any of the subsystems via the network. A rasterization subsystem can access texture data from its associated memory chips or can request texture data residing within any of the other memory chips. The request is sent over the internal network; the requested texture data is packetized and then sent over the internal network to the requesting rasterization subsystem. Because texture data is distributed across the internal network and is accessible to any and all rasterization subsystems, there is no need to store duplicate copies. Furthermore, the computer system is readily scaleable simply by adding the appropriate geometry, rasterization, or display subsystem.

BRIEF DESCRIPTION OF THE DRAWINGS

The operation of this invention can be best visualized by reference to the drawings.

DETAILED DESCRIPTION

A computer system having a distributed texture memory architecture is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
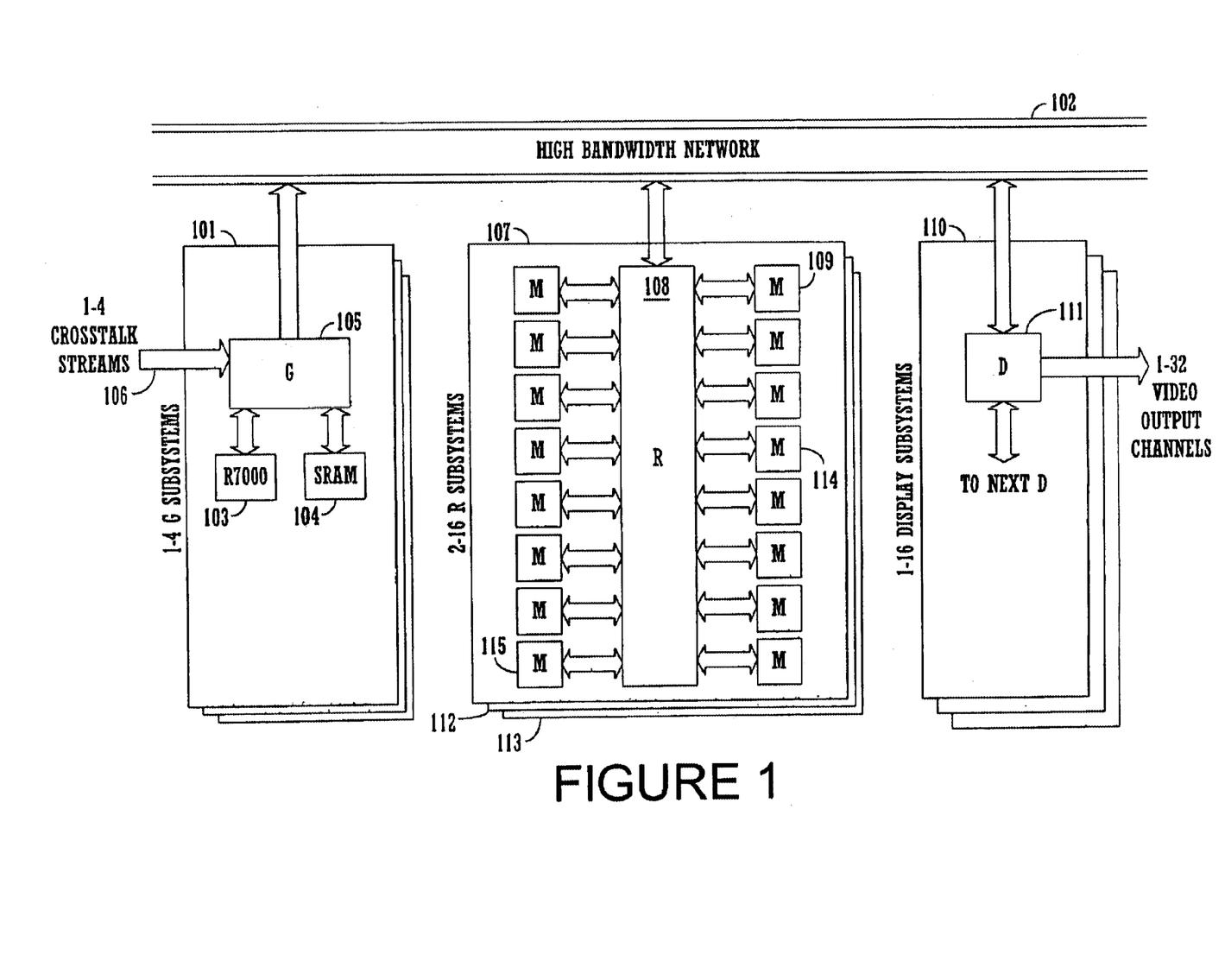
FIG. 1 shows a block diagram of the currently preferred embodiment of the network based computer system upon which the present invention may be practiced.

Referring now to FIG. 1, a block diagram of a network based computer system upon which the present invention may be practiced is shown. The network based computer system consists of a very high bandwidth point-to-point network based on a fully-connected topology, onto which a number of nodes are attached. Many different types of networks and protocols can be physically implemented. For example, an Ethernet based network can be used. Alternatively, a network as described in the patent application entitled, "Apparatus and Method For Utilizing Multiple Rendering Pipes For A Single 3-D Display," Ser. No. 09/177,911, now U.S. Pat. No. 6,292,200 filed on Oct. 23, 1998 and assigned to the present assignee, and which is incorporated in its entirety herein, can be used in the present invention. Four node types are contemplated: a geometry (G) subsystem, a rasterizer (R) subsystem, a display (D) subsystem, and a network (N) subsystem. One to four G subsystems 101 can be coupled to a high bandwidth network 102. The G subsystems comprise a multiprocessor 103 (e.g., the R7000 RISC microprocessor manufactured by MIPS Technologies), some static random access memory (SRAM) 104, and a geometry ASIC chip 105. The G chip 105 accepts instructions and data from Crosstalk streams 106 (Crosstalk is a proprietary interface technology from SGI). The instructions are executed by microprocessor 103 and G chip 105. G chip 105 also performs geometric calculations on vertex data. Data is temporarily cached in SRAM 104. Eventually, the resulting vertex data is sent over the high bandwidth network 102 to one of the R subsystems.

In the currently preferred embodiment, two to sixteen R subsystems 107 are used to perform pixel rasterization functions. R subsystems basically are comprised of a rasterization ASIC chip 108 and multiple memory (M) chips 109. The actual rasterization functions are performed by R chip 108, whereas framebuffer and texture memory is provided by the M chips. When an R chip requests texture data, part of the texture address is the R chip where the texture resides. If the requested texture data is found in the local M chips, it is fetched and the R chip can immediately perform texturing operations. Otherwise, if the texture data is not currently stored in a local M chip, a request is sent out over the network to the appropriate R chip to retrieve the desired texture data. The R chip sends the texture data over the internal network 102. The original requesting R chip receives the texture data and can then perform texture mapping functions. Essentially, texture data is distributively stored in one or more of the various M chips belonging to one or more R chips. And because the R chips can transmit and receive data to/from the internal network 102, data (e.g., texture) residing in different memory chips can effectively be shared between any or all of the R chips. This eliminates the need to store duplicate copies of texture maps. A single copy of the texture stored in any of the various M chips is accessible by any of the R chips over the internal network. Once the R chips generate the final pixel data, the data is temporarily stored in the framebuffer (e.g., one of the M chips) and then eventually sent over the high bandwidth network 102 to one of the display subsystems 110. One to sixteen display subsystems 110, comprised of a display ASIC chip 111, are used to drive one to thirty-two video output channels. One D chip can also be coupled to another D chip.

The network based computer system can be scaled by adding or removing G, R, and D subsystems as required. Likewise, the texture memory is readily scaled simply by adding more M chips or using M chips having greater memory capacity. Theoretically, any number of G, R, and D subsystems and any number of M chips can be implemented to form one integrated computer system. In its most basic configuration, the network computer must have at least one G subsystem, at least one R subsystem with at least one M memory chip, and at least one D subsystem. The user may improve the performance of the network computer system by adding the appropriate subsystem. For example, if more texture or framebuffer memory is needed, the user simply adds more R chips with their associated M chips. Adding more M chips proportionally increases the texture memory size because there is no need to store duplicate copies. In other words, adding one extra 64 Mb of M chip means that an additional 64 Mb of texture data can be stored. If geometric calculations are performed too slowly, one or more G subsystems can be added. One or more G subsystems can work to process primitives for a single frame's worth of display. For example, while a first G subsystem is processing primitives for one section of a frame, other G subsystem(s) can simultaneously be processing primitives for other section(s) of the frame. Moreover, pixels can be rendered faster by simply inserting additional R subsystems; and more displays can be driven by adding D subsystems.

Each of the G, R, and D subsystems can communicate with any other G, R, and D subsystem coupled to the high bandwidth network 102. Packets of data can be transmitted from any one of the subsystems to any other of the subsystems over the high bandwidth network 102. This allows portions of data (e.g., texture) to be stored in any of the M chips and still be accessible to any of the G, R, and D chips. Because data is accessible over the internal network, this eliminates the need to store duplicate copies of data. For example, suppose that portions of a texture map are stored in M chips 114 and 115 of R subsystem 107. Another R chip residing within R subsystem 112 can access these two portions by issuing a request with the appropriate address. The request is routed over the internal network 102 and received by R subsystem 107. R subsystem 107 examines the address and recognizes that it has the responsibility of servicing that request. The requested texture data is then read from the two M chips 114 and 115. The data is packetized and sent over the internal network 102 to the requesting R subsystem 112. Likewise, the R chip of R subsystem 113 could access the same texture data stored in M chips 114 and 115. Similarly, portions of texture and/or frame buffer data can be stored in the M chips belonging to different R subsystems and are, nevertheless, accessible to the other subsystems (G, R, or D) via the high bandwidth internal network 102. The goal then is to distribute the texture data evenly so as to minimize the possibility of having data request bottlenecks whereby the same piece of memory is accessed by multiple sources. The interfaces between the network and the G, R, and D subsystems are handled by one or more network (N) subsystems and high-speed buses. Increasing the number of subsystems also might entail adding N subsystems and additional buses.

The network supports several configurations, referred to as 2R, 4R (6 node), 8R (12 node), and 16R (24 node) configurations. A network based computer system has two complete networks in each configuration. A 16R network consists of 8 N chips, four in each network. In such a configuration, an N chip has four R ports, six Network ports, and two additional ports that connect to either a G chip or a string of up to 4 D chips. One of the G chips is designated as being the "primary" G chip corresponding to an N chip configuration. Each N chip contains two routing tables that need to be programmed before normal network activity is allowed to occur. This is accomplished by the primary G chip. It can be done via predefined tables or tables constructed through a network discovery process. The process is for the master G to probe the configuration register that each network connectable chip has at network address 0. After the entire network is searched, the correct tables can be constructed and written into each N chip. It should be noted that if multiple networks exist that are in different N chips (e.g., the 16R configuration), the primary G chip will have to program both networks separately.

Figure 2:
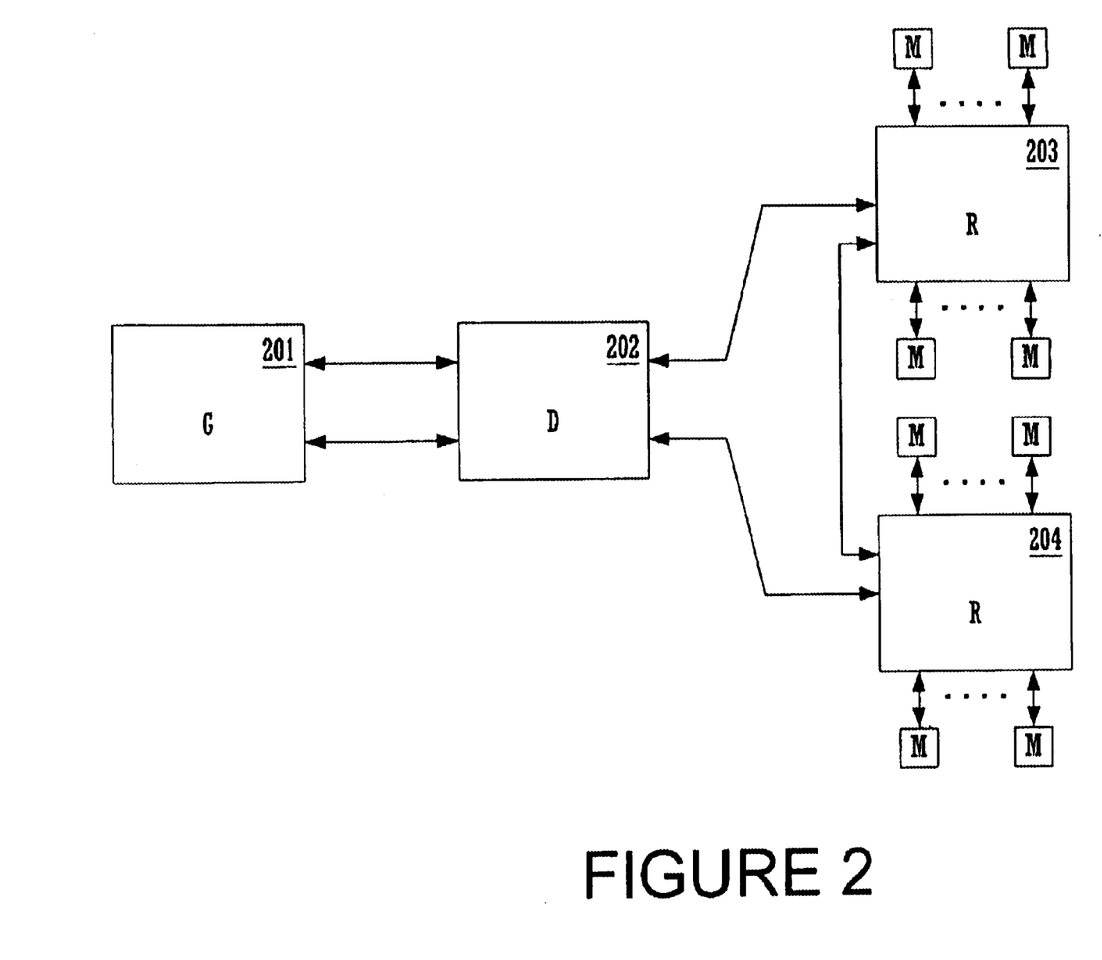
FIG. 2 shows a 2-R embodiment, whereby a G chip is coupled to a D chip, which in turn, is coupled to two R chips.

FIG. 2 shows a 2-R embodiment, whereby a G chip 201 is coupled to a D chip 202, which in turn, is coupled to two R chips 203 and 204. Each of the two R chips 203 and 204 can be coupled to a number of M chips for storing texture and/or framebuffer data. Although the 2 R configuration can be implemented as a depopulation, this 2R configuration does not require any N chips, and is therefore less expensive to build. In summary, the network based computer system consists of one or more host processors, G, R, M, N, and D subsystems/chips. The computer system can be readily scaled up by adding more of the appropriate types of chips. Also, by limiting the number of parts to just five basic types, the parts count and inventory is kept to a minimum. Yet, these types of chips form the foundations for implementing a wide variety of different configurations. Data generated and/or stored within any of these subsystems can be requested and routed to any of the other subsystems and chips over an internal network. In this manner, a single copy of a texture map can be stored in multiple M chips, but is accessible by any of the other chips. The other chips may simply request the relevant portions. The requested texture data is then packetized and transmitted over the internal network to the requesting subsystem/chip. This eliminates the need to store duplicate copies of texture maps. Furthermore, communications between the chips allows for greater flexibility in the manner by which processing is performed.

Figure 3:
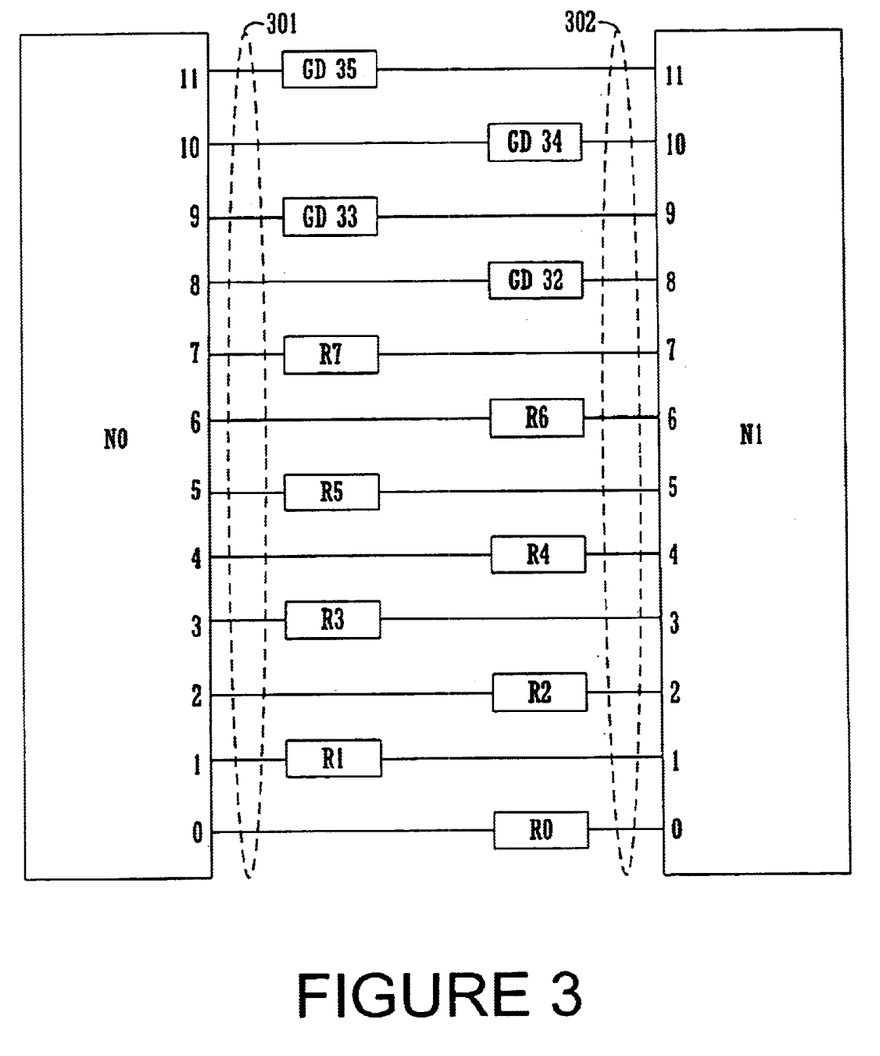
FIG. 3 shows an 8R configuration supporting 12 nodes.

FIG. 3 shows an 8R configuration supporting 12 nodes. Eight of the twelve nodes are used to support up to eight R chips (e.g., R0–R7). Sixteen M chips are coupled to each of the eight R0–R7 chips. The R0 chip is connected to port 0 of the N0 chip and to port 0 of the N1 chip; the R1 chip is connected to port 1 of the N0 chip and to port 1 of the N1 chip; the R2 chip is connected to port 2 of the N0 chip and to port 2 of the N1 chip; etc. The remaining four nodes can be connected to either G or D chips (e.g., GD32–GD35). In this 8R configuration, there are two networks. Network 0 is comprised of the N0 chip and paths 301; Network 1 is comprised of the N1 chip and paths 302. In one embodiment, each network fits entirely in a single N chip. Thereby, texture data stored in any of the memory chips is accessible to any and all of the R0–R7 chips via the paths 301–302 and N0–N1 chips.

Figure 4:
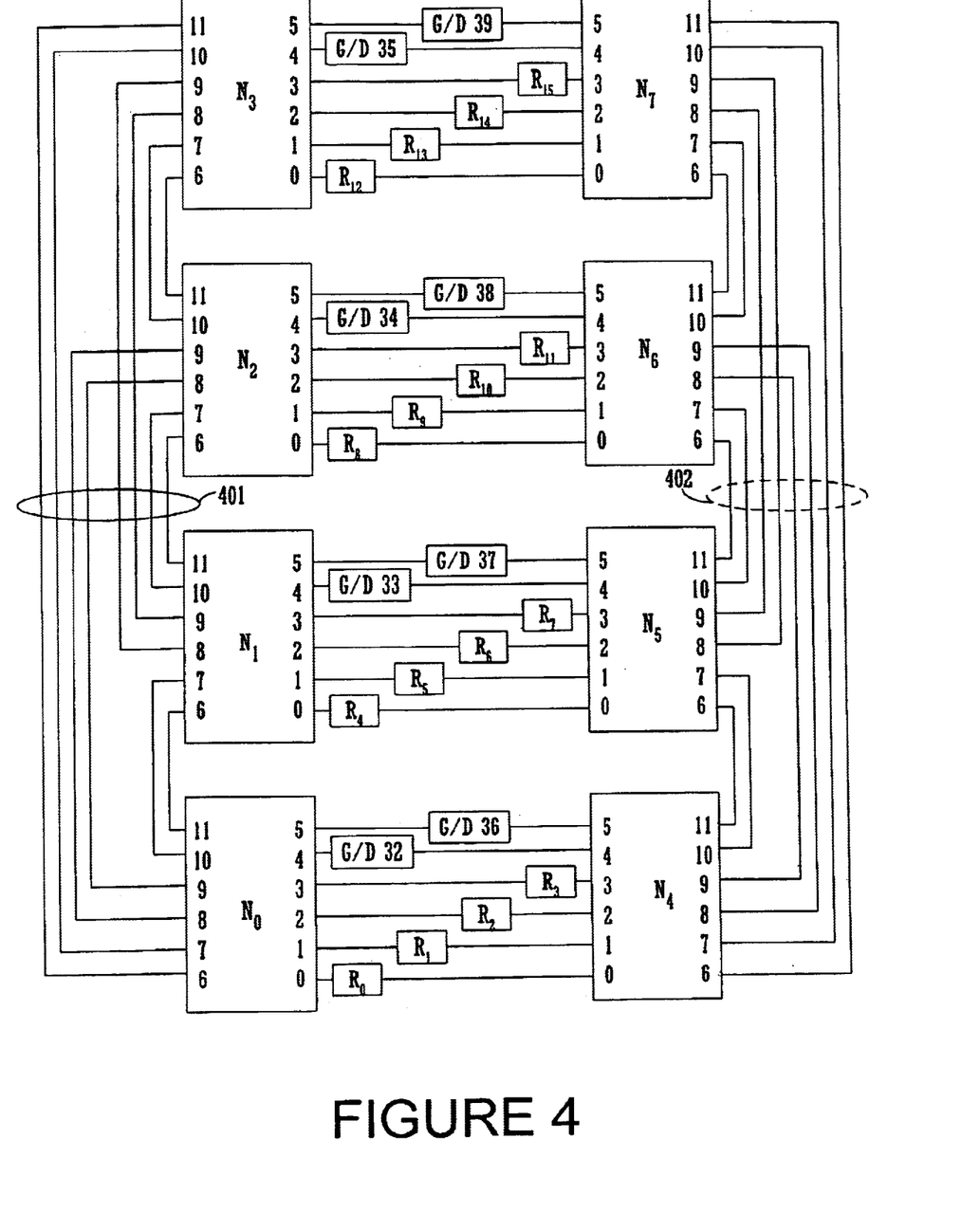
FIG. 4 shows a 16R configuration which supports 24 nodes.

FIG. 4 shows a 16R configuration which supports 24 nodes. In this 24 node configuration, there are eight N chips (N0–N7). These eight N chips support 16 R chips (R0–R15). Each of these 16 R chips has its own number of M chips (not shown). The R0 chip is connected to port 0 of the N0 chip and to port 0 of the N4 chip; the R1 chip is connected to port 1 of the N0 chip and to port 1 of the N4 chip; the R2 chip is connected to port 2 of the N0 chip and to port 2 of the N4 chip; and the R3 chip is connected to port 3 of the N0 chip and to port 3 of the N4 chip. Likewise, the R4—R7 chips are respectively connected to ports 0–3 of the N1 chip and to ports 0–3 of the N5 chip; the R8–R11 chips are respectively connected to ports 0–3 of the N2 chip and to ports 0–3 of the N6 chip; and the R12–R15 chips are respectively connected to ports 0–3 of the N3 chip and to ports 0–3 of the N7 chip. These same eight N chips also support up to eight G or D chips. For instance the G/D 32 chip connected to port 4 of the Ni chip and also connected to port 4 of the N4 chip, can either be a G chip or a D chip. Likewise, the G/D 36 chip connected to port 5 of the N1 chip and also connected to port 5 of the N4 chip, can either be a G chip or a D chip. In the case of the 16 R configuration, each N-to-N chip path has two statically allocated paths or "networks" (e.g., paths 401 and paths 402). Two networks are used to provide more overall bandwidth to the system. Texture data stored in any of the memory chips is accessible to any and all of the 16 R0–R15 chips via the paths 401–402 and N0–N7 chips.

Figure 5:
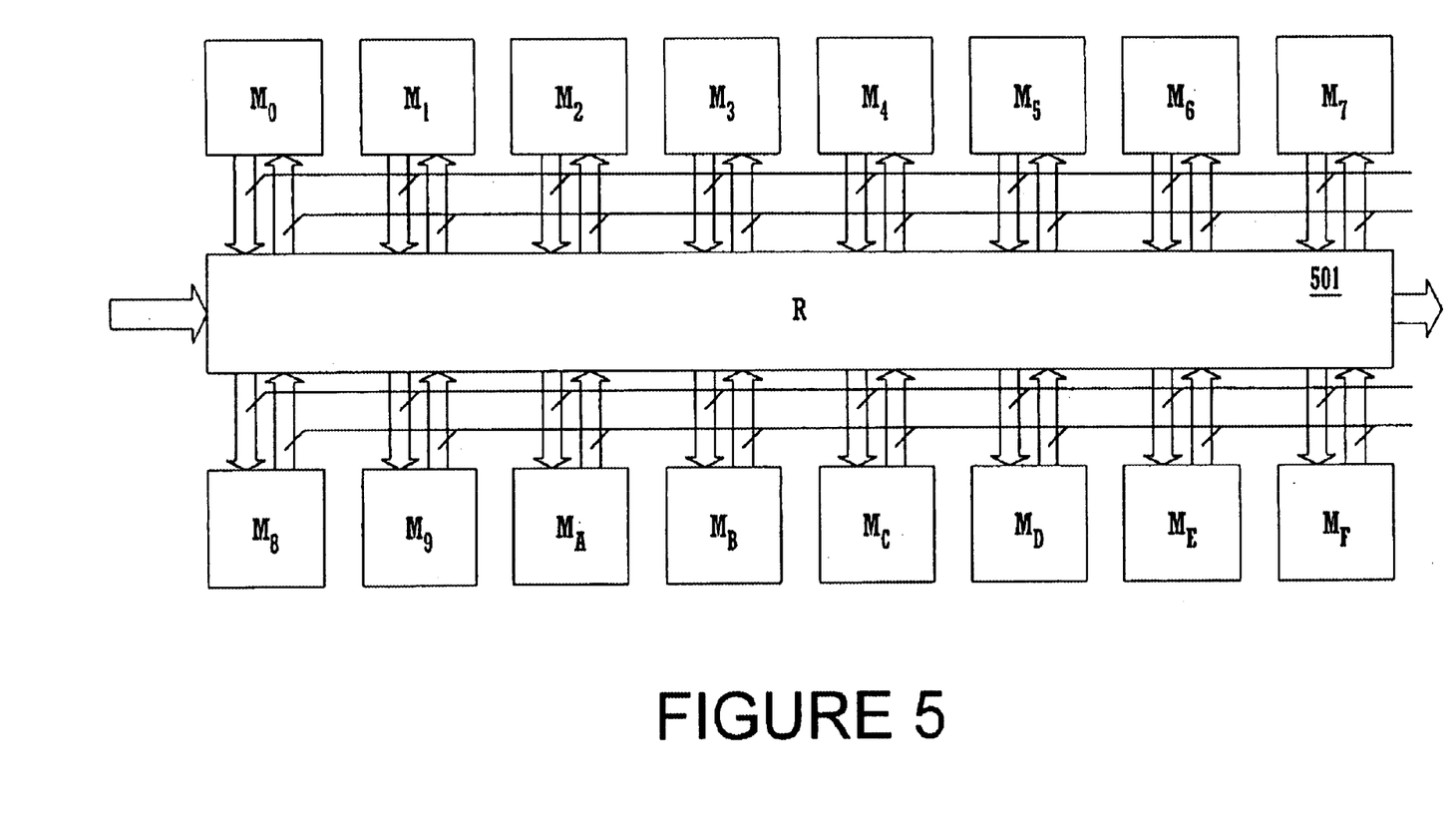
FIG. 5 shows a block diagram of the rasterizer subsystem.

FIG. 5 shows a block diagram of the rasterizer subsystem. The R subsystem is comprised of an R chip 501 coupled to 16 M chips (e.g., M0–MF). The R subsystem performs two main functions: (1) rendering incoming geometric and pixel primitives into specified 16×16 screen patches and (2) servicing requests for texture or frame buffer memory. The main functional part of the rasterizer subsystem is the R chip 501. As stated above, the R chip 501 accepts geometric and pixel primitives from the network and renders each one into a specified 16×16 screen patch. The R chip 501 also handles requests from other R chips for texture data and requests from the display subsystem for frame buffer data. Attached to this are sixteen M (multisample) memory chips, which are used to store the frame buffer screen patches corresponding to the subsystem. A fixed portion of the M memory (typically 3 megabytes per R), is used as a G-to-R FIFO. Any remaining memory is allocated to texture storage and is shared among all rasterizer subsystems. In addition to providing the unified memory for the rasterizer subsystem, the hybrid DRAM/ASIC technology of the M chips supplies enough memory bandwidth to support multisample capability. In the currently preferred embodiment of the present invention, each M chip has 32M bits of on-chip storage. The M chips use ASIC-on-DRAM technology and implements OpenGL Per-Fragment operations, framebuffer, texture memory, and G FIFO memory.

Figure 6:
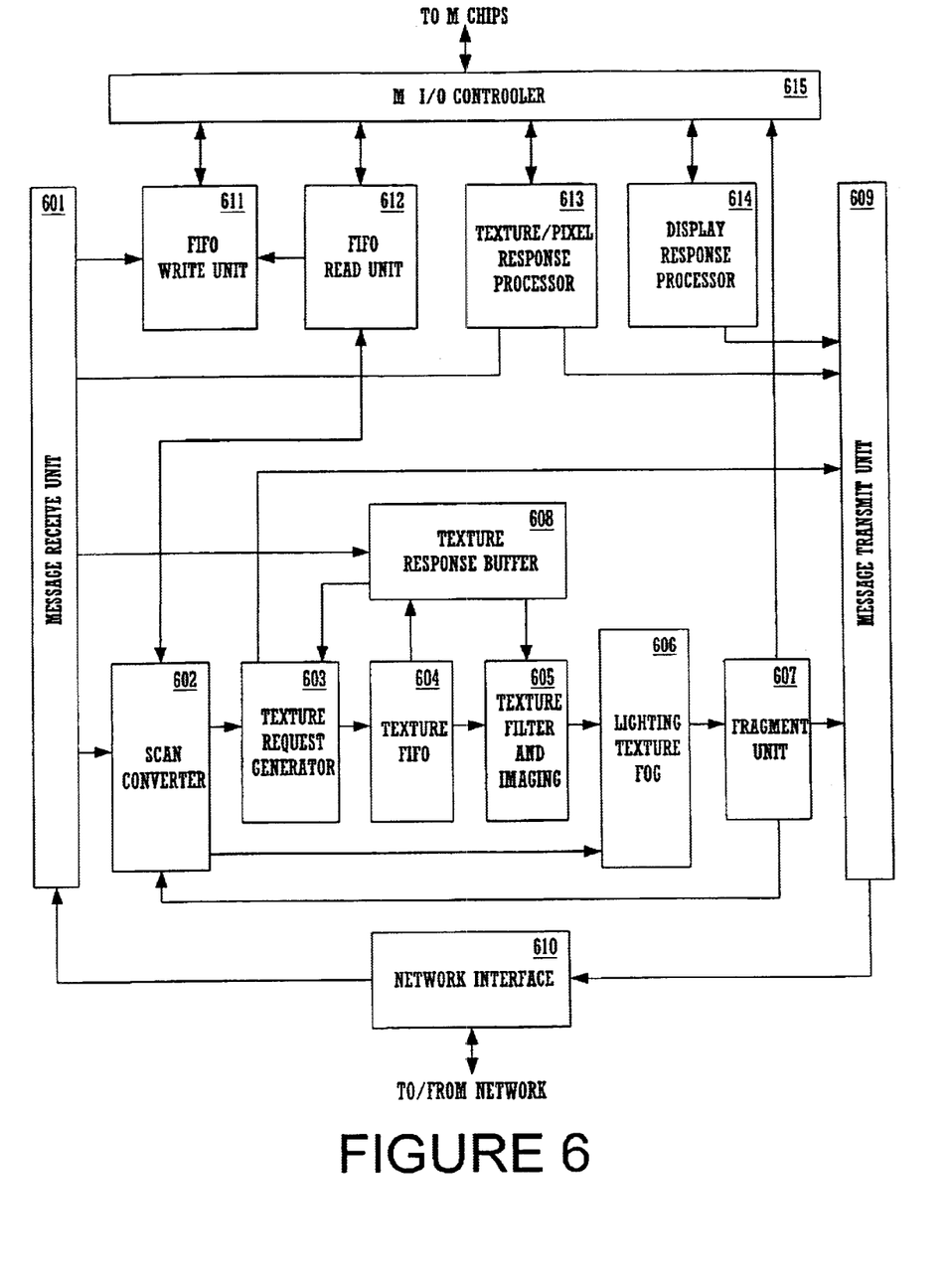
FIG. 6 is a schematic diagram of an exemplary R chip.

FIG. 6 is a schematic diagram of an exemplary R chip. The R chip accepts draw stream commands from one to four G chips. It processes points, lines, triangle strips, triangle fans, writing and reading of rectangular arrays of pixels and texels, and local pixel copies. A network is used to support two, four, eight, or sixteen R chips. Each R chip manages framebuffer and texture memory in units of 16×16 pixels or texels. Input to the R chip arrives on the network interface 610. This includes draw commands and pixel read requests from the G chips, texel requests and responses from other R chips, and display pixel requests from the D subsystems. Output from the R chip occurs on the network interface 610. Outputs include read pixel responses, statistics output and FIFO throttle control to the G subsystems, texel requests and responses to other R chips and display pixel responses to the D subsystems.

The R chip is comprised of the message receive unit 601; scan converter 602; texture request generator 603; texture FIFO 604; texture filter and imaging unit 605; lighting, texture, and fog unit 606; fragment unit 607; texture response buffer 608; message transmit unit 609; network interface 610; FIFO write unit 611; FIFO read unit 612; texture/pixel response processor 613; display response processor 614; and M input/output (I/O) controller 615. The message receive unit 601 accepts packets from the input network interface 610 and delivers them to the appropriate block within the R chip. The scan converter 602 scan converts and z-rejects primitive packets and also generates texture coordinates for the texture request generator 603. The texture request generator 603 receives one, two, or three texture coordinates for a pixel and generates the required tile addresses for tiles that need to be loaded into the texture response buffer 608 in order to process the pixel. The texture FIFO 604 stores all the information needed by the texture response buffer 608 and texture filter and imaging unit 605 in order to filter texture. The data includes cache addresses, tile addresses, and filter coefficients. The texture FIFO 604 is sized to handle the latency of a texture request/response. Texture filter and imaging unit 605 performs the necessary filtering for texture mapping and image processing including convolution and texture look-up table support. A lighting, texture, and fog chiplet 606 accepts pixels from the scan converter 602 and filtered texture from the texture filter and imaging unit 605 and performs per-pixel lighting, texture environment, and fog computation. Fragments from the lighting, texture, and fog chiplet 606 are input to fragment unit 607 which redistributes the fragments to the M chips for processing. It also handles all the buffering of fragment, download, and register packets to the M chips. Furthermore, fragment unit 607 handles sync packets and processes coarse Z culling data returning from the M chips. The fragment unit 607 also incorporates the coarse Z buffer. Texture response buffer 608 primarily acts as a cache for texture requests and deals with the long latency from the time a texture tile is requested until it arrives back from the network. It also contains texture format promotion and decompression hardware.

The message transmit unit 609 receives packets generated in various chiplets, pads them if necessary, and drives them into the network interface 610 for transmission to the N chip. The network interface chiplet 610 allows any network based computer chip to send and receive data over one fully-connected internal network. An R, G, or D chip is coupled to a pair of 96-bit wide send/receive FIFO interfaces. A FIFO write unit 611 accepts a G chip command stream from the message receive unit 601 and makes write requests to the M I/O controller 615. The FIFO read unit 612 reads ahead from the M I/O controller 615 pages allocated for G commands to keep a small FIFO of G commands or pixel textures ready to deliver to the scan converter 602. A texture/pixel response processor 613 converts texture requests from R chips and texture read and pixel read packets from G chips into M I/O read requests. The data read from the M I/O controller 615 is formatted into packets and sent to the message transmit unit 609. The display response processor 614 is responsible for handling pixel requests from the D subsystem. As pixel data is read from the M I/O controller 615, the display response processor 614 applies any requested data conversions needed for video. And the M I/O controller 615 handles all requests to an M chip.

Given multiple R chips, synchronization schemes should be implemented to guarantee correct ordering of operations between the various R chips. In the currently preferred embodiment, one or more G chips are used to process independent graphics contexts and send one or more streams of commands to one or more R chips. Each stream of commands may include drawing commands and texture download commands that must be processed by one or more of the R chips, since both the frame buffer and texture memory are distributed over the R chips. Any G chip may send commands to any R chip.

Each R chip has separate command FIFOs for each of the G chips. An R chip will always process the commands it receives from a given G chip in order, but the R chip may interleave commands from different G chips in some arbitrary order. Furthermore, the different R chips process their FIFOs independently. It is possible for some of the R chips to get far ahead of the other R chips in terms of processing. This property helps to reduce temporary load imbalances across the various R chips.

Synchronization is necessary in the following situations. First, for texture downloads, the new texture data must not overwrite the old texture data until all R chips finish all drawing commands that use the old texture data. Also, drawing commands cannot use the new texture data until the download finishes. Second, for swapbuffers, the buffer swap must wait until all R chips finish all drawing commands that precede the swapbuffers. Subsequent drawing commands must wait for the buffer swap, unless there is a cushion buffer. Third, for readpixels and copypixels, the source rectangle must be read after all drawing commands that precede the read/copy but before any subsequent drawing commands that may overwrite the source. The R chips must coordinate since the pixel data must be transferred between the various chips. Fourth, for deallocation of scratch textures, the imaging pipeline makes frequent use of scratch textures (e.g., textures that are allocated for temporary storage during a pixel operation and then deallocated when the operation completes). A scratch texture must not be deallocated by the texture memory manager until all of the R chips finish the associated imaging operation. Fifth, for context switches and glfinish, all pending commands in all of the R chips must be completed. And sixth, for application-level synchronization, the new wait_group GLX extension, which allows an application that uses multiple G chips to synchronize the command streams in different G chips, and the flush_raster extension (for pipeline instruments) require the R chips to complete all pending commands before starting any new ones.

For performance reasons, it is preferable to minimize stalling any part of the system at a synchronization point, particularly during texture downloads and pixel operations. Consequently, for cases in which there is a good load balance across the R chips, the synchronization method should not cause stalls. If the load balance is poor, then the lightly-loaded R chips may be allowed to stall, while the heavily loaded R chips catch up.

The currently preferred synchronization scheme is to insert numbered identification (ID) tokens into the command stream and to keep track of which R chips have reached each token. An R chip can be instructed to wait until all of the R chips have reached a particular token. A block of hardware called the "synchronizer" keeps track of the last synchronization point reached by each of the R chips. It is an autonomous block with a connection to the network, so it can be located anywhere in the system (e.g., the G or N chip). There should be one synchronizer per G chip.

The synchronization scheme uses three commands. The SetSyncID(g, i) command marks a particular point in a command stream coming from G chip, g, and names it with the integer, i. The command is broadcast to all R chips. When an R chip processes all of the commands in its command stream up to a SetSyncID(g, i) command, the R chip is said to have reached sync point i (in g's command stream). The WaitSyncID(g, i) command causes the R chips to block until all R chips have reached sync point i in g's command stream. This command is broadcast to all R chips. The ConditionalWaitSyncID(g, i, condition) command injects a WaitSyncID(g, i) command into the command stream, possibly at a later time, when a condition is met. Two conditions can be specified. The Conditional WaitSyncID(g, i, NEXT_DRAW) command causes a WaitSyncID(g, i) command to be sent to all of the R chips just before the next drawing command. If a ConditionalWaitSyncID command or a WaitSyncID command is received before the next drawing command, then the old ConditionalWaitSyncID command is canceled without generating a WaitSyncID command. This behavior allows a wait to be squashed if the condition is not satisfied before the next WaitSyncID or ConditionalWaitSyncID command. Second, sometime before a ConditionalWaitSyncID (g, i, DRAW_PENDING) command is issued, a special register (e.g., the DRAW_PENDING) is cleared. Every time a drawing command is issued to an R chip, it sets the DRAW_PENDING register. When a ConditionalWaitSyncID(g, i, DRAW_PENDING) commands arrives, if a drawing command has been executed since the last time the DRAW_PENDING register was cleared, then a WaitSyncID(g, i) command is immediately sent to all of the R chips and the DRAW_PENDING register is cleared to zero. Otherwise, this command has no effect.

The presently preferred synchronization scheme also uses a special asynchronous command that is not part of the normal command stream but may be generated by the synchronizer and sent to the R chips. This UpdateSyncID(g, i) command indicates that all R chips have reached sync point i in g's command stream. It is used to communicate to each of the R chips that a sync point has been reached by all of the other R chips.

When a SetSyncID(g, i) command reaches the end of the rasterization pipeline in the R chip and all earlier drawing commands in the pipeline have been committed to the frame buffer, the R chip forwards the command to the synchronizer associated with the G chip, g. By forwarding the command, the R chip is announcing that it has reached the sync point. The synchronizer has one memory location per R chip for storing the last sync point that each of the R chips has reached. When an R chip forwards a SetSyncID(g, i) command to the synchronizer, the synchronizer stores "i" in the appropriate location. In addition to collecting the SetSyncID commands, the synchronizer continuously computes the minimum value of all of its sync ID's. The minimum value is the ID of the last sync point that all of the R chips have reached. Whenever that value increases, the synchronizer sends an UpdateSyncID(g, j) command, where j is the minimum sync ID, to each of the R chips. Each R chip has a register, called SyncID(g), containing the value from the last UpdateSyncID command it has received for G chip, g.

When an R chip executes a WaitSyncID(g, i) command, it blocks at the beginning of the rasterization pipeline, before any of the following primitives in the rasterizer FIFO have started to execute, until the value in the local SyncID(g) register is greater than or equal to i. This command will cause the R chip to stall until all of the R chips have passed sync point i and notified the synchronizer. It should be noted that when an R chip receives an UpdateSyncID(g, i) command, it must immediately update its local SyncID(g) register. This command does not go into the command FIFO. The ConditionalWaitSyncID(g, i, condition) command is processed and consumed by a primitive engine (PE). When the PE sees a ConditionalWaitSyncID(g, i, condition) command, it saves the value of i and sets a bit indicating that a ConditionalWaitSyncID command has been seen. If another ConditionalWaitSyncID(g, i, condition) command arrives, then i is overwritten by j. If a WaitSyncID(g, k) command arrives, then the bit is cleared and the WaitSyncID command is sent to all of the R chips as usual. If a drawing command arrives and the bit is set, then the bit is cleared and a WaitSyncID(g, i) is sent to all of the R chips before the geometry.

The sync ID's in the above commands are used in increasing order. Hence, if entry points A and B issue SetSyncID commands and B follows A, then the ID used by B must be greater than A. Eventually, the Ids wrap back to 0, but this can be handled using modulo arithmetic. All contexts on the same G chip use the same sequence of sync Ids. If context C1 uses ID n just before context C2 is switch in, then context C2 gets id n+1 the next time it needs a sync ID. If context C1 gets switched back in, it starts using Ids wherever C2 left off. This policy guarantees that the R chips always see monotonically increasing sync ID numbers even after a context switch. Sync Ids are allocated by microcode in the pipeline. This allows the current context to allocate the next sync id simply by sending a command to the pipeline.

For texture download synchronization, texture downloads must be synchronized with drawing primitives that use the texture data. There are two cases to consider: (1) a texture download followed by drawing commands that use the new texture data and (2) drawing commands followed by a texture download that overwrites old texture data. To handle the first case, a SetSyncID(g, i) command is issued after the texture download and a WaitSyncID(g, i) is issued before the first drawing command that uses the texture data. To handle the second case, a SetSyncID(g, j) command is issued after the last drawing command that uses the old texture data and a WaitSyncID(g, j) command is issued before the texture download. These commands guarantee proper synchronization. And if the application allows sufficient time between using a texture and downloading the texture data, then the WaitSyncID commands will not cause any stalls.

In summary, to guarantee that a texture download happens before the texture data is used by subsequent primitives: (1) after a texture download, issue a SetSyncID(g, i) command to mark the completion of the download followed by a ConditionalWaitSyncID(g, i, DRAW) command which forces any drawing commands dependent on the texture to wait for the download. Also, record the value of i with the texture and (2) after binding a texture, issue a WaitSyncID(g, i) command to wait until the last download of the texture has completed. Note that if the application binds a different texture immediately after a texture download, then the WaitSyncID(g, j) generated by the bind squashes the ConditionalWaitSyncID(g, i, DRAW) that was generated by the download. To guarantee that a texture download does not overwrite texture data required by earlier primitives: (1) after binding a texture, issue a SetSyncID(g, i) command to mark that the previously-bound texture is not bound any more and record the value of i with the texture. Also, issue a command to clear the DRAW_PENDING register. After this point, the register is set whenever a drawing command is executed so that any subsequent drawing commands that may have used the newly bound texture can be detected. And (2) before a texture download, if the texture was previously bound and unbound, then issue a WaitSyncID(g, i) to make the R chips wait for the unbind to complete. This guarantees that any drawing commands from the previous bind have completed. Next, issue a SetSyncID(g, j) command followed by a ConditionalWaitSyncID(g, j, DRAW_PENDING) command. These commands cause the R chips to wait until any drawing commands issued since the last bind have also completed. The download may then proceed.

This synchronization mechanism requires that the texture manager keep track of two sync IDs per texture: the sync point right after the last time the texture was downloaded (to wait before the next draw operation) and the sync point right before the last time the texture was unbound (to wait before the next load). A table, managed by the host processor and contained in the G chip contains a small cache of sync ID's. When the host issues a command to create a new sync ID, it send a table index for storing that ID. Table indexes are used in a round-robin fashion. The pipeline then increments the current sync ID; if the old ID in the specified table entry is not "undefined," a WAIT is issued for that ID; and the current sync ID is stored in the table entry. When the host processor issues a command to wait on a sync ID, it sends the corresponding table index. The pipeline then issues a WAIT for the ID in the specified table entry if it is not "undefined" and also sets the table entry to "undefined." When the host issues a WAIT, this command guarantees that either the pipeline waits for an ID that is greater than or equal to the intended ID in the case that the table entry is not "undefined" or a WAIT on the intended ID has already been issued in the case that the table entry is "undefined."

Thus, a scaleable network based computer system having a distributed texture memory architecture is disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer system comprising:

a host processor for issuing commands;

a network within the computer system that transmits packetized data over a plurality of paths;

a geometry subsystem directly coupled to the network that performs geometry calculations corresponding to the three-dimensional graphics according to commands from the host processor;

first and second rasterization subsystems coupled to the network each of which renders pixels based on geometry data generated by the geometry subsystems directly;

a first plurality of memory chips coupled to the first rasterization subsystem for storing texture data, and a second plurality of memory chips coupled to the second rasterization subsystem for storing texture data, wherein only a single copy of texture data corresponding to a texture map is distributed among the first and second plurality of memory chips collectively; and a display subsystem directly coupled to the network for displaying textured three-dimensional graphics onto a monitor.

2. The computer system of claim 1 further comprising at least three rasterization subsystems all coupled to the network, wherein each of the three rasterization subsystems exchange packets over the network and the packets contain texture data.

3. The computer system of claim 1, wherein the first memory further stores frame buffer data.

4. The computer system of claim 1, wherein the second rasterization subsystem can access the texture data stored in the first memory and second memory over the network.

5. The computer system of claim 1 further comprising a texture manager which provides synchronization.

6. The computer system of claim 5, wherein the texture manager prevents a first polygon from being drawn until after a first set of texture data has finished loading and prevents a second set of texture data from starting to load until the first polygon has finished being drawn.

7. The computer system of claim 1, wherein the geometry subsystem receives drawing commands from the host processor, transforms vertices and assembles primitives while a rasterizer subsystem renders pixels and services requests for texture or frame buffer data.

8. The computer system of claim 1 further comprising a plurality of pipelines, each pipeline having at least one instance of each of a geometry subsystem, a rasterization subsystem and a display subsystem wherein only a single copy of texture data exists within the computer system.

9. A computer system comprising:

a host processor;

a geometry subsystem directly coupled to data transfer lines for transferring packets of data;

a first rasterization circuit directly coupled to the data transfer lines, wherein the rasterization circuit rasterizes a first set of primitives of a three-dimensional image;

a first memory coupled to the first rasterization circuit which stores texture data corresponding to a first portion of a texture map;

a second rasterization circuit directly coupled to the data transfer lines, wherein the second rasterization circuit rasterizes a second set of primitives of the three-dimensional image;

a second memory coupled to the second rasterization circuit which stores texture data corresponding to a second portion of the texture map, wherein no more than a single copy of texture data corresponding to the texture map is distributed among the first and second memories, and wherein the first rasterization circuit performs texturing operations corresponding to the first set of primitives using the first portion of the texture map read from the first memory and the second portion of the texture map read from the second memory while the second rasterization circuit performs texturing operations on the second set of primitives using the first portion of the texture map read from the first memory and the second portion of the texture map read from the second memory.

10. The computer system of claim 9 further comprising:

a network circuit coupled to the data transfer lines which controls transfers of packets between the first rasterization circuit and the second rasterization circuit, wherein packets of texture data read from the first memory are transmitted to the second rasterization circuit and packets of texture data read from the second memory are transmitted to the first rasterization circuit.

11. The computer system of claim 9, wherein the first memory further stores frame buffer data.

12. The computer system of claim 10 further comprising a plurality of geometry circuits coupled to the network circuit, wherein each of the geometry circuits processes primitives in parallel.

13. The computer system of claim 10 further comprising a plurality of display circuits coupled to the network circuit for driving one or more monitors.

14. The computer system of claim 9, wherein the geometry circuit receives drawing commands from the host processor, transforms vertices and assembles primitives while the first rasterizer circuit renders geometric and pixel primitives and services requests for texture or frame buffer data.

15. A computer implemented method for generating a three-dimensional image, comprising the steps of:

issuing drawing commands by a host processor to generate the three-dimensional image;

transmitting the drawing commands to a geometry subsystem directly the geometry subsystem connected to a subsystem interconnection network;

calculating geometry data corresponding to polygons comprising the three-dimensional image;

transmitting the geometry data to a rasterization subsystem as packets over the network;

rendering pixels based on geometry data generated by the geometry subsystem;

accessing distributed texture data stored in different memory locations over the network as packets, wherein only a single copy of the texture data is distributed among the different memory locations in at least two rasterization subsystems; and transmitting pixel data as packets over the network to a display subsystem for displaying the three-dimensional image onto a display screen.

16. A computer-implemented method of generating a three-dimensional image comprising the steps of:

generating a plurality of polygons;

storing a first portion of a texture map in a first memory associated with a first rasterization circuit;

storing a second portion of the texture map in a second memory associated with a second rasterization circuit, wherein no more than a single copy of the texture map is distributed among the first and second memories;

rasterizing a first set of primitives of the three-dimensional image by the first rasterization circuit wherein texture mapping is performed by accessing texture data corresponding to the first portion of the texture map stored in the first memory and accessing the second portion of the texture map stored in the second memory;

rasterizing a second set of primitives of the three-dimensional image by the second rasterization circuit, and generating frame buffer data; wherein texture mapping is performed by accessing texture data corresponding to the first portion of the texture map stored in the first memory and accessing the second portion of the texture map stored in the second memory; and displaying the three-dimensional image using a display subsystem which is directly connected via a network with the first and second rasterization circuits.

17. The method of claim 16 further comprising the steps of:

reading texture data from the first memory;

packetizing the texture data read from the first memory;

transmitting packetized texture data read from the first memory to the second rasterization circuit.

18. The method of claim 16 further comprising the steps of:

preventing a first polygon from being drawn until after a first set of texture data has finished loading;

preventing a second set of texture data from starting to load until the first polygon has finished being drawn.

* * * * *